United States Patent
Wuest et al.

(12) 
(10) Patent No.: US 7,029,734 B1
(45) Date of Patent: *Apr. 18, 2006

(54) PACKAGING FILM, PACKAGE AND PROCESS FOR ASEPTIC PACKAGING

(75) Inventors: Sam Edward Wuest, Oshkosh, WI (US); Richard Roy Bellile, Menasha, WI (US)

(73) Assignee: Curwood, Inc., Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/224,705

(22) Filed: Aug. 20, 2002

(51) Int. Cl.
*B32B 1/08* (2006.01)
*B32B 15/08* (2006.01)

(52) U.S. Cl. .................. 428/35.3; 428/35.8; 428/35.9; 428/220; 428/451; 428/458; 428/461; 428/476.1; 428/476.9; 428/483; 428/516; 428/520; 428/910

(58) Field of Classification Search ............. 428/219, 428/220, 451, 458, 461, 476.1, 476.3, 476.9, 428/483, 516, 520, 910, 34.9, 35.3, 35.4, 428/35.8, 35.9, 36.6, 36.7
See application file for complete search history.

(56) References Cited

U.S. PATENT DOCUMENTS

| | | | | |
|---|---|---|---|---|
| 5,112,673 A | * | 5/1992 | Sawada et al. | 428/216 |
| 6,112,498 A | | 9/2000 | Hansson et al. | 53/69 |
| 6,316,067 B1 | * | 11/2001 | Edwards et al. | 428/34.9 |
| 6,354,061 B1 | | 3/2002 | Bellei et al. | 53/167 |
| 6,397,557 B1 | | 6/2002 | Bassissi et al. | 53/51 |
| 6,503,617 B1 | * | 1/2003 | Jacobsen et al. | 428/336 |

* cited by examiner

*Primary Examiner*—D. S. Nakarani
(74) *Attorney, Agent, or Firm*—Curwood, Inc.; Tom J. Hall

(57) ABSTRACT

A multilayer packaging film, package and process for aseptic packaging applications. The multilayer packaging film includes (a) an inner sealant layer comprising a olefin polymer having a Vicat Softening Point greater than 90° C.; (b) an oxygen barrier layer; and (c) an outer layer comprising a polymeric layer selected from olefin polymers and polyester homopolymers or copolymers having a silicone or other hydrogen peroxide resistant exterior coating, said outer layer having a Vicat Softening Point greater than 90° C.

21 Claims, 1 Drawing Sheet

PACKAGING FILM, PACKAGE AND PROCESS FOR ASEPTIC PACKAGING

BACKGROUND OF THE INVENTION

The present invention relates to multilayer packaging films useful for producing aseptic packages. More particularly, the present invention relates to multilayer films and methods for producing aseptic stick-pack packages. Machines for packaging food products are known in which packages are formed from a continuous tube of packaging material defined by a longitudinally sealed portion. The choice of packaging material depends on the product to be packaged, but in most applications, the packaging material incorporates more than one material in the structure that is assembled by lamination or coextrusion processes.

Aseptic packaging applications require that the packaging film provide several basic requirements for success in the marketplace. First, the packaging film must be suitable for use in contact with the intended product such as a foodstuff or medicinal product as required by the U.S. Food and Drug Administration, and must comply with applicable material migration requirements such as for hexane extractables. Second, the packaging film must provide physical integrity to assure containment of the product and maintenance of the sterility, as well as the ability to be processed in packaging machines. The term physical integrity applies to the structural integrity of the packaging film itself, as well as that of any closures and seals, formed therein or applied thereto, to assure package soundness and hermeticity during package formation, handling and distribution. Third, the packaging film must be able to be sterilized and be compatible with the method of sterilization used (i.e., heat, chemical, or radiation). And lastly, the packaging film must provide adequate barrier protection to maintain product quality until it is used. Barrier protection means control over the transmission of oxygen, moisture, light, and aroma through the package as required by the intended product.

In typical processes for producing aseptic packages the packaging film is unwound off a reel and fed through a sterilizing unit in which it is sterilized, for example, by immersion in a bath of liquid sterilizing agent such as a concentrated solution of hydrogen peroxide and water to destroy putrefactive microorganisms.

More specifically, the sterilizing unit may comprise a bath filled, in use, with the sterilizing agent in which the strip is fed continuously. The bath may conveniently comprise a reservoir of hydrogen peroxide solution wherein two parallel vertical branches connected at the bottom to define a U-shaped path of film having a length depending on the traveling speed of the film and such as to allow enough time to treat the packaging film. For effective and fairly fast treatment, so as to reduce the size of the sterilizing chamber, the sterilizing agent is usually maintained at a high temperature of, say, approximately 70° C.

The sterilizing unit may comprise an aseptic chamber in which the packaging film issuing from the sterilizing bath is subjected to mechanical processing (e.g. by drying rollers) and thermal/fluidic processing (e.g. by hot-air jets) to remove any residual sterilizing agent. The amount of residual sterilizing agent allowed in the packaged product, in fact, is governed by strict standards (the maximum permissible amount being in the order of a few parts per million).

Generally, before leaving the aseptic chamber, the film is folded into a cylinder and sealed longitudinally to form, in known manner, a continuous, vertical, longitudinally sealed tube. More specifically, the packaging film is fed vertically through a number of successive forming assemblies, which interact with the film to gradually form the film from a generally flat sheet, through an open C-shape to a substantially circular shape. The tube of packaging film is filled with the product and then fed to a forming and (transverse) sealing unit for forming individual packages and by which the tube is gripped between pairs of jaws to seal the tube transversely and form aseptic packages. Cutting the sealed portions between the packages then separates the pillow-shaped packs.

Packaging machines of the above type are used in a wide range of food industries; and performance of the packaging film, in particular, is such as to amply conform to standards governing asepticity of the packages and residual sterilizing agent.

SUMMARY OF THE INVENTION

According to the present invention a novel packaging film for aseptic packaging comprising (a) an inner polymeric surface sealant layer comprising an olefin polymer having a Vicat Softening Point greater than 90° C.; (b) an intermediate oxygen barrier layer; and (c) an outer polymeric surface layer having a Vicat Softening Point greater than 90° C. and selected from (i) olefin polymers and (ii) polyester homopolymers or copolymers having an exterior surface coating selected from silicone or other hydrogen peroxide resistant coatings, wherein said packaging film has a total thickness of 4.0 mils or less.

In another embodiment, a novel aseptic package may be made from the foregoing packaging film on a vertical, multilane packaging machine.

A novel process for aseptically packaging a product comprising the steps of: (A) providing a packaging film comprising (1) an inner sealant layer comprising an olefin polymer having a Vicat Softening Point greater than 90° C.; (2) an oxygen barrier layer having an oxygen transmission rate less than 15.5 cc $O_2/m^2$/day; and (3) an outer layer having a Vicat Softening Point greater 90° C. and selected from (i) olefin polymers and (ii) polyester homopolymers or copolymers having an exterior coating selected from silicone; (B) exposing both surfaces of said packaging film to hydrogen peroxide; (C) removing substantially all hydrogen peroxide from the surfaces of said packaging film; (D) forming a substantially vertical, longitudinally sealed tube; (E) filling said tube with a material to be packaged; (F) sealing transversely across said tube to enclose the material to be packaged to form individual packages; and (G) cutting the packaging film through sealed areas between individual packages.

DETAILED DESCRIPTION OF THE INVENTION

Figure 1:
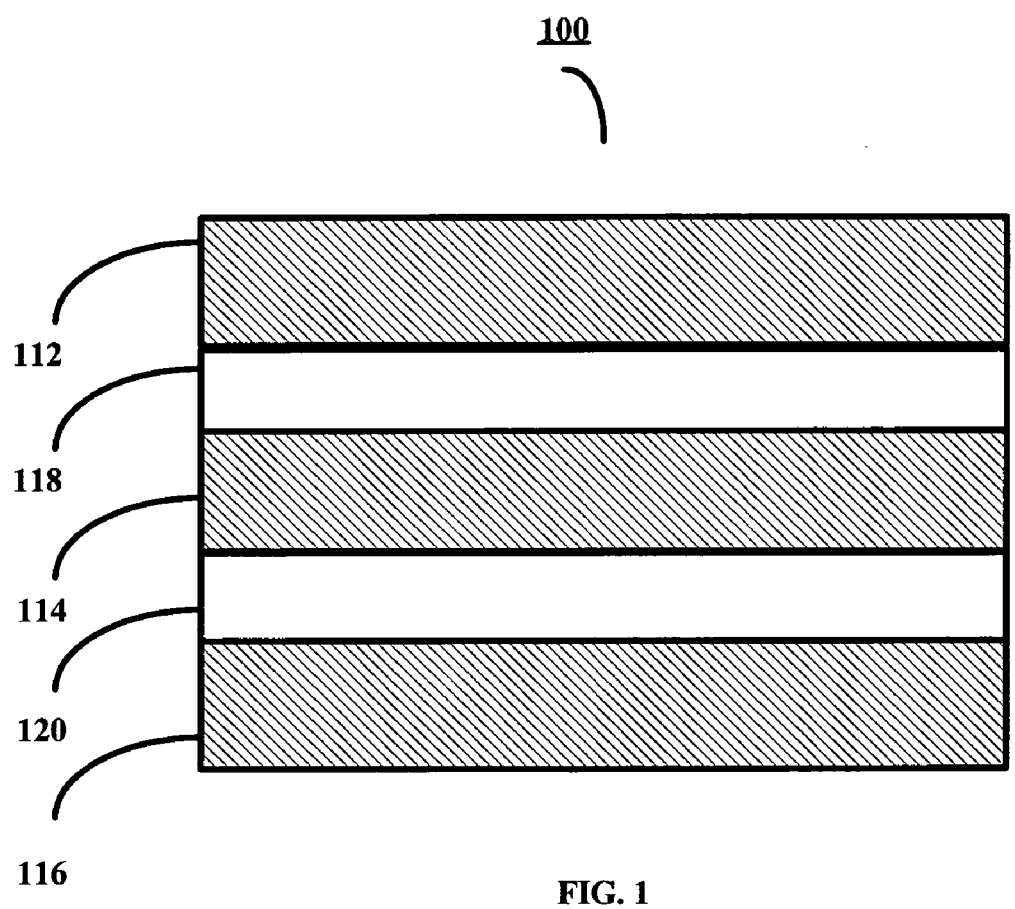
FIG. 1 is a schematic cross-section of a preferred embodiment of a multilayer film according to the invention.

The packaging film, package and process of the present invention may be used for packaging various substances, particularly pumpable, low-acid foods, such as pudding and dairy products, as well as medicinal products such as enteral solutions, that require aseptic conditions for proper shelf life. The invention has particular utility for aseptic stick-pack packaging applications, wherein the packaging film is exposed to a hot hydrogen peroxide solution bath and thereafter formed into a substantially vertical, longitudinally sealed tube on a multilane, vertical packaging machine.

In discussing polymer layers, plastic films and packaging, various acronyms are used herein and they are listed below. In referring to film structure, a slash "/" will be used to indicate that components to the left and right of the slash are in different layers and the relative position of components in layers may be so indicated by use of the slash to indicate film layer boundaries. A hyphen "-" will be used to denote that the polymers or monomers so separated are copolymerized. Acronyms commonly employed herein include:

PE—Polyethylene (ethylene homopolymer and/or copolymer of a major portion of ethylene with one or more α-olefins)

PVDC—Polyvinylidene chloride (also includes copolymers of vinylidene chloride, especially with vinyl chloride).

EVOH—A saponified or hydrolyzed copolymer of ethylene and vinyl acetate.

$C_2$—ethylene monomer
$C_4$—butene-1 monomer
$C_6$—hexene-1 monomer
$C_8$—octene-1 monomer
$C_{10}$—decene-1 monomer Unless specifically noted the polymers defined herein are "unmodified" by any intentional grafting or copolymerization with modifying moieties such as dienes, rubber moieties or acrylic acids. However, the polymers may contain chemicals or additives in small amounts (typically under 1% by weight based on the weight of the polymer) which are present as by-products of the polymer manufacturing process or otherwise added by polymer manufacturers including e.g. catalyst residues, antioxidants, stabilizers, antiblock materials, slip agents and the like. The polymers may also contain other components, for example colorants, typically in amounts less than 15% by weight. Polymeric blends and other modifications known in the art may also be made.

The terms "laminate", "laminate film" or "laminated" as used herein means at least two film surfaces are physically joined or bonded to each other by an adhesive lamination process or extrusion lamination process.

The term "barrier" or "barrier layer" as used herein means a layer of the multilayer film which acts as a physical barrier to oxygen and/or moisture. The term "oxygen barrier" as used herein means a layer of a multilayer film which acts as a physical barrier to oxygen. The barrier layer may be present as part of a multilayer coextruded film, or may comprise a separate layer that forms part of a laminated structure.

Referring to the drawings, FIG. 1 shows a cross-sectional view of a packaging film of the present invention generally indicated at 110. The packaging film comprises an inner sealant layer 116, an outer layer 112 and an oxygen barrier layer 114 disposed between the inner sealant layer 116 and the outer layer 112. The packaging film 110 may include additional interior layers, such a first tie layer 118 and second tie layer 120 that provide for the bonding of layers, or other layers (not shown) that provide other desired functionality to the packaging film such as stiffness. In preferred embodiments, the packaging film has a total thickness of 4.0 mils or less; preferably less than 3.7 mils; more preferably less than 3.3 mils.

The inner sealant layer 116 acts as the innermost layer, or interior surface layer, of a resultant package and comes in contact with the foodstuff or medicinal material packaged by the packaging film. Thus, in addition to having suitable heat-sealing properties, the inner sealant layer 116 is preferably suitable for food and/or drug contact and should possess low hexane extractable values, such as determined by the U.S. Food and Drug Administration. Furthermore, the inner sealant layer 116 must be resistant to deformation or de-lamination due to contact with a hot hydrogen peroxide sterilization solution and must not appreciably absorb hydrogen peroxide. The inner sealant layer should also shed the hydrogen peroxide sterilization solution quickly and easily since the amount of residual sterilization solution permitted in a final packaged product is governed by strict standards (the maximum permissible amount being in the order of a few parts per million). The inner sealant layer 116 should also provides good machinability and facilitates passage of the film over equipment.

The inner sealant layer 116 comprises an olefin polymer having a Vicat Softening Point (ASTM D-1525) greater than 90° C.; preferably greater than 100° C.; more preferably greater than 105° C.; and preferably has a Melting Point greater than 120° C. Advantageously, it has been found that olefin polymers having a Vicat Softening Point lower than 90° C. become too tacky (insufficient "hot slip") during processing/packaging to run properly on vertical, multilane machines. Preferably, the olefin polymer is selected from the group of ethylene/α-olefin copolymers, particularly including substantially linear ethylene-α-olefin copolymers such as linear low density polyethylene (LLDPE), low density polyethylene (LDPE), high density polyethylene (HDPE), polypropylene-ethylene copolymers and mixtures thereof. As used herein, the term "ethylene-α-olefin" generally designates copolymers of ethylene with one or more comonomers selected from C3 to C10 α-olefins, such as butene-1, pentene-1, hexene-1, octene-1, methylpentene-1 and the like. Additionally, polypropylene-ethylene copolymers suitable for the inner sealant layer 116 include less than 30% by weight ethylene content, preferably less than 20% and more preferably less than 10% ethylene content. Preferably, the olefin polymer selected for the inner sealant layer 116 has a density greater than 0.910 g/cc; more preferably greater than 0.915 g/cc. Suitable polymers for the inner sealant layer 116 include ATTANE 4201 (Ethylene-octene-1 copolymer having a reported Vicat Softening Point of 93° C., Melting Point of 123° C. and a density of 0.912 g/cc) DOWLEX 2045 (LLDPE having a reported Vicat Softening Point of 108° C., Melting Point of 122° C. and a density of 0.920 g/cc), both available from The Dow Chemical Company, Midland, Mich., USA.

The oxygen barrier layer 114 is formed of any suitable oxygen barrier material or blend of materials which will control the oxygen permeability of the packaging film. For perishable food packaging, the oxygen $O_2$ permeability (or "$O_2$ gas transmission rate") desirably should be minimized. Preferably, the packaging film will have an $O_2$ permeability of less than about 20 $cm^3/m^2$ for a 24 hour period at 1 atmosphere, 0% relative humidity and 23° C., and preferably less than 15 $cm^3/m^2$, more preferably less than 10 $cm^3/m^2$. The $O_2$ permeability can be measured by ASTM D-3985-81, which is incorporated herein in its entirety by reference thereto. The oxygen barrier layer 114 is preferably selected from ethylene-vinyl alcohol copolymer (EVOH), metallized films, copolymers of vinylidene chloride (PVDC) such as PVDC-vinyl chloride (PVDC-VC) or PVDC-methylacrylate, metal foil and oxide coated films such as aluminum or silicon oxide coated films. As used herein, "metallized film" generally designates polymeric films having a thin layer of metal, preferably aluminum, deposited on the surface thereof by known techniques, such as vapor deposition. Preferred metallized films include metallized biaxially oriented polyethylene terephthalate (mOPET) and metallized biaxially oriented nylon (mBON). For certain embodiments of the present invention, a preferred barrier layer comprises mOPET. For yet another certain embodiment of the invention, a preferred barrier layer comprises mBON. For certain other embodiments of the invention, the oxygen barrier layer 114 preferably comprises $Al_2O_3$ coated oriented polyethylene terephthalate (OPET) or aluminum foil.

The outer layer 112 may include any polymeric layer that provides peroxide resistance to the packaging film and may also preferably provide dimensional stability, machineability and abuse and heat resistance. The outer layer 112 is also preferably suitable for register printing. The outer layer 112 is preferably selected from olefin polymers and coated polyester homopolymers or copolymers. The coated polyesters have an exterior surface coating selected from silicone or other hydrogen peroxide resistant coatings. The silicone coating is preferably cross-linked. Preferably, the outer layer has a Vicat Softening Point greater than 90° C.; preferably greater than 100° C.; more preferably greater than 105° C. The outer layer 112 is preferably selected to have a Vicat Softening Point greater than or equal to the Vicat Softening Point of the inner sealant layer 116. The olefin polymers are selected from the group of ethylene-α-olefin copolymers, low density polyethylene (LDPE), high density polyethylene (HDPE), polypropylene-ethylene copolymers, polypropylene homopolymers and copolymers and mixtures thereof. The ethylene-α-olefin copolymers, low density polyethylene (LDPE), high density polyethylene (HDPE), polypropylene-ethylene copolymers are the same as those described for the inner sealant layer 116. The polypropylene homopolymers and copolymers may preferably be selected from biaxially oriented polypropylene homopolymer or copolymer film (BOPP) and a cast polypropylene homopolymer or copolymer film. For a certain preferred embodiment of the invention, the outer layer comprises BOPP. No polyester layer is exposed to the hydrogen peroxide sterilization solution due to the exterior coating. Un-coated polyester layers as surface layers have been found to absorb hydrogen peroxide, causing the edges to swell and unsuitable tracking on packaging machines. Thus, the outer surface of any polyester layer is protected by an exterior coating, while the opposite surface is protected by being adhered to an interior layer of the packaging film.

The outer layer 112 is preferably printed with an ink or graphics layer prior to being laminated with the oxygen barrier layer 114 and inner sealant layer 116. The printing is positioned such that it is located on the interior surface of the outer layer 112 of the resultant laminate, either adhered to the oxygen barrier layer 114 or another interior layer.

The packaging film 110 may include one or more intermediate layers between the oxygen barrier layer 114 and inner sealant layer 116 and/or between the outer layer 112, such as the first and second tie layers 118 and 120 shown in FIG. 1. Tie layers 118 and 120 may respectfully assure adhesion between the oxygen barrier layer 114 and the outer layer 112 and inner sealant layers 116 respectively. These tie layers may be identical or different from each other, and may include a wide variety of polymeric materials known to those in the art. Suitable tie layer materials are known to those skilled in the art and will generally vary depending on the layers to be joined. For example, if an EVOH layer or a metallized film is selected as the barrier layer, some form of tie layer, adhesive layer, or extrusion laminate layer will be required to bond to the inner sealant layer and or the outer layer. In a preferred embodiment of the invention, the inner sealant layer 116 comprises a first surface layer of a multilayer coextruded film having the structure: LDPE/tie/EVOH/tie/LLDPE, wherein the LLDPE comprises the inner surface sealant layer 116 of the multilayer packaging film 110 and makes contact with the packaged product.

In preferred embodiments, at least one of the polymeric layers of the packaging film is oriented, preferably biaxially oriented. Advantageously at least one layer may provide the biaxial orientation, preferably the outer layer 112 or the oxygen barrier layer 114, for example a metallized film. Oriented film components may be used to add desirable stiffness, heat resistance, dimensional stability and/or tear properties in combination with the other layers of the overall film structure. Additionally, the films of the present invention will advantageously have less than 5% shrink (preferably less than 2%) in either or both directions at 90° C. (preferably at 135° C.). Shrinkage values are obtained by measuring unrestrained shrink of a 10 cm square sample immersed in water (or other non-reactive liquid) at 90° C. (or the indicated temperature if different) for ten seconds. Test specimens are cut from a given sample of the film to be tested. The specimens are cut into squares of 10 cm length M.D. by 10 cm. length T.D. Each specimen is completely immersed for 10 seconds in a 90° C. (or the indicated temperature if different) water bath. The specimen is then removed from the bath and the distance between the ends of the shrunken specimen is measured for both the M.D. and T.D. directions. The difference in the measured distance for the shrunken specimen and the original 10 cm. side is multiplied by ten to obtain the percent of shrinkage for the specimen in each direction. Generally, the shrinkage of 4 specimens is averaged and the average M.D. and T.D. shrinkage values reported.

Since the inventive aseptic packages, particularly aseptic stick-packs, are particularly adapted to packaging of products, such as pudding, directed to children, the packaging film may advantageously include tear properties that allow small children to open the packages easily. Advantageously, the packaging film may have an Elmendorf Tear Value (ASTM D-1922-94a) of between 10 to 300 grams force. Preferred Elmendorf tear values of less than 200 grams, beneficially less than 100 grams, may be obtained in preferred embodiments of the present invention. Further, in a preferred embodiment, the packaging film has sufficient stiffness to maintain an upright tubular condition when formed into a tubular package after filling with a product and sealing, and most preferably after opening while being hand-held for consumption of the product contained therein.

Films of the present invention may be formed into packages of various sizes. The films are particularly adapted for producing aseptic "stick-packs" on multilane, vertical packaging machines such as SVL-AS 20/30 sold by Hassia USA, Inc., Morganville, N.J., USA.

Multilane, vertical packaging machines manipulate a packaging film by substantially folding the film into a cylinder and sealing longitudinally to form, in known manner, a vertical, longitudinally sealed tube. More specifically, the strip of packaging film is fed vertically through a number of successive forming assemblies, which interact with the strip to gradually form the strip from a generally flat sheet, through an open C-shape to a substantially circular shape. The tube of packaging film is filled with the product and then fed to a forming and (transverse) sealing unit for forming individual packages and by which the tube is gripped between pairs of jaws to seal the tube transversely and form aseptic stick-packs. The "stick-packs" generally have a length substantially greater than the width thereof. Cutting the sealed portions between the packs then separates the pillow-shaped packs.

A particularly preferred packaging film according to the invention comprises a laminate of an inner sealant layer of LLDPE film, an outer layer of BOPP film and an oxygen barrier layer comprising a mOPET film. The LLDPE layer comprises a surface layer of a five-layer coextruded film having the following structure: LDPE/tie/EVOH/tie/LLDPE. The five-layer coextruded film has a thickness of approximately 2.0 mils. The outer layer BOPP film is approximately 70 gauge and is printed with ink on one surface thereof. The mOPET oxygen barrier film is approximately 48 gauge. The five-layer coextruded film is laminated to the mOPET film with a first intermediate adhesive layer such that the LDPE surface of the five-layer film is adhered to the non-metallized surface of the mOPET film. The printed surface of the 70 gauge outer layer BOPP film is laminated to the metallized surface of the 48 gauge mOPET film by a second intermediate. Thus, the final structure of the particularly preferred packaging film comprises: (outside) 70 ga. BOPP/ink/adhesive/48 ga. mOPET/adhesive/(LDPE/tie/EVOH/tie/LLDPE) (inside) and a total thickness of about 3.5 to 3.6 mil.

Preferred embodiments of the multilayer films of the present invention provide an excellent combination of beneficial properties including dimensional stability, register printability, hot tack properties, oxygen barrier properties and peroxide resistance. Thus, the films of the present invention are particularly suited for use in small-sized aseptic packaging applications. Beneficial uses include packages having less than 454 grams of product contained therein. Advantageously, packages having 100 grams or less may be made.

The films of the present invention are particularly suited for aseptic packaging of pumpable products, such as pudding, dairy products and other low-acid foodstuffs, or medical products such as enteral solutions. The present invention includes a novel process for aseptically packaging a product comprising the steps of: (A) providing a packaging film comprising (1) an inner sealant layer comprising an olefin polymer having a Vicat Softening Point greater than 90° C.; (2) an oxygen barrier layer having an oxygen transmission rate less than 15.5 cc $O_2/m^2$/day; and (3) an outer layer having a Vicat Softening Point greater 90° C. and selected from (i) olefin polymers and (ii) polyester homopolymers or copolymers having an exterior coating selected from silicone; (B) exposing both surfaces of said packaging film to hydrogen peroxide; (C) removing substantially all hydrogen peroxide from the surfaces of said packaging film; (D) forming a substantially vertical, longitudinally sealed tube; (E) filling said tube with a material to be packaged; (F) sealing transversely across said tube to enclose the material to be packaged in individual packages; and (G) cutting the packaging film through sealed areas between individual packages. The process is adapted for use on commercial vertical, multilane packaging machines.

The invention may be further understood by reference to the following examples. Suitable LDPE's for use with the present invention include materials having a density of 0.920 g/cc and 1 dg/min. Melt Index. Melt Index is measured by ASTM D-1238, condition E (190° C.)(except for propene based (greater than 50% $C_3$ content) polymers are tested at condition TL (230° C.)). Suitable BOPP films include AET 70T523-3 available from Applied Extrusion Technology. Suitable tie layers include rubber-modified and anhydride-modified ethylene-α-olefin copolymers such as TYMOR 1203 from Rohm and Haas. Suitable EVOH polymers include SOARNOL ET 3803 (38 mol % ethylene and 3 dg/min.). Suitable LLDPE materials include DOWLEX 2045 available from Dow Chemical Company. Melting Point is mesured by ASTM D-3418, peak m.p. determined by DSC with a 10° C./min. heating rate. Average Gauge is measured by ASTM D-2103. All ASTM test methods noted herein are incorporated by reference into this disclosure.

EXAMPLE 1

Multilayer films were produced and tested to determine their resistance to exposure to a heated hydrogen peroxide bath. The film constructions are detailed below.

Film # 1

A multilayer film was prepared in accordance with the present invention by adhesively laminating an outer layer of 70 ga. biaxially oriented polypropylene film (BOPP) having printed graphics on a surface thereof to a 48 ga. metallized, oriented polyethylene terephthalate film (mOPET) oxygen barrier layer such that the printed graphics layer was adhered to the metallized surface of the mOPET film using a urethane-based aromatic laminating adhesive. A multilayer coextruded film having the structure LDPE/tie/EVOH/tie/LLDPE was adhesively laminated to the mOPET layer on a side opposite the printed BOPP layer, such that the LLDPE layer formed the innermost layer of the total film construction. The resultant multilayer film had the following structure (outside) 70 ga. BOPP/ink/adhesive/48 ga. mOPET/adhesive/(LDPE/tie/EVOH/tie/LLDPE) (inside) and a total thickness of about 3.5 mil.

Film #2

Film #2 is a comparative example (not of the invention). The structure of film #2 was the same as that described for Film #1 except that a 36 ga. un-coated, oriented polyethylene terephthalate (OPET) film replaced the 70 ga. BOPP outer layer. This film included the following structure: 36 ga. OPET/ink/adhesive/48 ga. mOPET/adhesive/2.0 mil (LDPE/tie/EVOH/tie/LLDPE) (inside). The total thickness was approximately 3.1 mil.

Film #3

Film #3 (of the invention) was the same as film #1 except that the 48 ga. mOPET layer was replaced with a 48 ga. aluminum oxide ($Al_2O_3$) coated OPET. The complete structure of film #3 was: 70 ga BOPP/Ink/adhesive/48 ga $Al_2O_3$ coated OPET/adhesive/2.0 mil (LDPE/tie/EVOH/tie/LLDPE) (inside). The total thickness was approximately 3.5 mil.

Film #4

Film #4 (of the invention) was the same as described for film #1 except that the 48 ga. mOPET was replaced with a 48 ga. metallized biaxially oriented nylon (mBON) film and the 2.0 mil (LDPE/tie/EVOH/tie/LLDPE) film was replaced with a 1.5 mil cast polypropylene film. The total thickness was approximately 3.0 mil.

Film #5

Film #5 (of the invention) was identical to film #1 except that the 48 ga. mOPET layer was replaced with a 35 ga. aluminum foil layer. The total thickness was approximately 3.4 mil.

Each of films #1–5 were tested for hydrogen peroxide resistance. Film samples measuring approximately 4.5 inches by 14.5 inches were cut from each film. The film samples were placed in separate 500 ml containers filled with 35% hydrogen peroxide solution available from Fisher Scientific. Lids were securely fastened and the containers were placed in a 2 gallon container. The 2 gallon container with the 500 ml sample containers was placed into a constant temperature oven set at 160° F. for one hour. The container was then removed from the oven and allowed to cool to room temperature. The film samples were removed from the sample containers, rinsed with water and wiped dry. The samples were then visually inspected for signs of de-lamination and/or blistering along the edges, or in the ink areas. Any visible sign of de-lamination and/or blistering was considered to fail the test. If no failure had occurred, the sample was returned to the sample container and oven for additional time. This process was continued until failure was observed. The results of the testing are provided in Table 1.

TABLE 1

| Film Sample | Time to Failure |
|---|---|
| 1 | 8 hours (no de-lamination) |
| 2a | 4.75 hours (minor de-lamination) |
| 2b | 5 hours (severe de-lamination) |
| 3 | 24 hours (no de-lamination) |
| 4a | 8 hours (minor de-lamination) |
| 4b | 24 hours (severe de-lamination) |
| 5 | 24 hours (no de-lamination) |

Two samples were tested for films #2 and #4 as evidenced by film samples 2a, 2b, 4a and 4b. Unacceptable films for aseptic packaging will exhibit severe de-lamination at less than 8 hours of exposure to a heated hydrogen peroxide sterilization solution. As is evident from Table 1, Film #2 experiences severe de-lamination after 5 hours exposure to the heated hydrogen peroxide sterilization solution. This demonstrates that Film #2 is not adapted for aseptic packaging.

Advantageously, the films of the present invention will not contain exposed polyester or polyamide outer surfaces (not including cross-sectional edges of the film), while un-coated polyesters and polyamide layers may be used as internal layers of the packaging film.

EXAMPLE 2

Inventive Film #1 was further tested for Elmendorf Tear Values according to ASTM D-1922-94a, which is incorporated herein in its entirety by reference. The tear values of four samples were measured in both the transverse direction (TD) and machine direction (MD) of the film. The results are reported in Table 2 below.

TABLE 2

| | Elmendorf Tear Values | |
|---|---|---|
| Sample | Transverse Direction | Machine Direction |
| 1 | 44 | 52 |
| 2 | 38 | 51 |
| 3 | 39 | 53 |
| 4 | 40 | 54 |
| Average | 40.25 | 52.5 |

The results in Table 2 indicate that inventive film #1 has tear values sufficient to produce an integral package which is easy to open by tearing.

The films, packages and processes of the present invention may also employ combinations of characteristics as described in one or more of the claims including dependent claims which follow this specification and, where not mutually exclusive, the characteristics and limitations of each claim may be combined with characteristics or limitations of any of the other claims to further describe the invention.

The above examples serve only to illustrate the invention and its advantages, and they should not be interpreted as limiting since further modifications of the disclosed invention will be apparent to those skilled in the art in view of this teaching. All such modifications are deemed to be within the scope of the invention as defined by the following claims.

What is claimed is:

1. A multilayer film laminate adapted for aseptic packaging applications, said film comprising:
   (a) an inner polymeric surface sealant layer comprising an olefin polymer having a Vicat Softening Point greater than 90° C.;
   (b) an intermediate oxygen barrier layer comprising a metallized film selected from metallized biaxially oriented polyester terephthalate and metallized biaxially oriented nylon; and
   (c) an outer polymeric surface layer selected from the group consisting of olefin polymers having a Vicat Softening Point greater than 90° C. and polyester homopolymers or copolymers having a silicone exterior coating; wherein said multilayer film laminate has a total thickness of less than 4.0 mil.

2. The multilayer film laminate of claim 1, wherein said inner sealant layer is selected from the group consisting of ethylene-α-olefin copolymers, low density polyethylene, high density polyethylene, polypropylene-ethylene copolymers and mixtures thereof.

3. The multilayer film laminate of claim 1, wherein said inner sealant layer comprises an ethylene-α-olefin copolymer.

4. The multilayer film laminate of claim 3, wherein said ethylene-α-olefin copolymer comprises a copolymer of ethylene and at least one $C_3$ to $C_{10}$ α-olefin.

5. The multilayer film laminate of claim 4, wherein said at least one $C_3$ to $C_{10}$ α-olefin is selected from hexene-1 and octene-1.

6. The multilayer film laminate of claim 1, wherein said inner sealant layer has a melting point greater than 120° C.

7. The multilayer film laminate of claim 1, wherein said inner sealant layer has a density greater than 0.910 g/cc.

8. The multilayer film laminate of claim 1, wherein said inner sealant layer has a density greater than 0.910 g/cc.

9. The multilayer film laminate of claim 1, wherein said olefin polymer comprises a propylene-ethylene copolymer having an ethylene content of less than 10% by weight.

10. The multilayer film laminate of claim 1, wherein said outer layer is selected from the group consisting of ethylene-α-olefin copolymers, low density polyethylene, high density polyethylene, polypropylene-ethylene copolymers, polypropylene homopolymers and copolymers, and polyester homopolymers and copolymers having a silicone exterior coating.

11. The multilayer film laminate of claim 1, wherein said outer layer comprises a biaxially oriented polypropylene homopolymer or copolymer film.

12. The multilayer film laminate of claim 1, wherein said outer layer comprises a cast polypropylene homopolymer or copolymer film.

13. The multilayer film laminate of claim 1, wherein said outer layer includes a layer of ink printed on at least one surface thereof.

14. The multilayer film laminate of claim 1, wherein said film laminate further includes at least one first intermediate layer between said inner sealant layer and said oxygen barrier layer.

15. The multilayer film laminate of claim 1, wherein said film laminate further includes at least one second intermediate layer between said outer layer and said oxygen barrier layer.

16. The multilayer film laminate of claim 1, wherein said inner sealant layer comprises an exterior surface layer of a multilayer coextruded film.

17. The multilayer film laminate of claim 16, wherein said multilayer coextruded film includes five layers including an interior surface layer comprising low density polyethylene, a first tie layer, an ethylene-vinyl alcohol copolymer layer, a second tie layer and an exterior surface layer, wherein said first polymeric adhesive tie layer bonds said interior surface layer to a first surface of said ethylene-vinyl alcohol copolymer layer and said second polymeric adhesive tie layer bonds a second surface of said ethylene-vinyl alcohol copolymer layer to the exterior surface layer of said multilayer coextruded film.

18. The multilayer film laminate of claim 1 having an Elmendorf tear strength of 300 grams force or less in at least the transverse direction.

19. A multilayer film laminate adapted for aseptic packaging applications, said film comprising:
(a) an inner polymeric surface sealant layer comprising a olefin polymer having a Vicat Softening Point greater than 90° C. selected from the group consisting of ethylene-α-olefin copolymers, low density polyethylene, high density polyethylene, polypropylene-ethylene copolymers and mixtures thereof;
(b) an intermediate oxygen barrier layer comprising a metallized film selected from metallized biaxially oriented polyester terephthalate and metallized biaxially oriented nylon; and
(c) an outer polymeric surface layer comprising a biaxially oriented polypropylene homopolymer or copolymer film a polymeric layer selected from the group consisting of ethylene-α-olefin copolymers, low density polyethylene, high density polyethylene, polypropylene-ethylene copolymers, polypropylene homopolymers and copolymers, and polyester homopolymers and copolymers having a silicone exterior coating, said outer layer having a Vicat Softening Point greater than 90° C.; wherein said multilayer film laminate has a total thickness of less than 4.0 mil.

20. An aseptic package for food items formed from a packaging film folded into a cylinder and sealed longitudinally, said packaging film including:
(i) an inner surface sealant layer comprising a olefin polymer having a Vicat Softening Point greater than 90° C.;
(ii) an intermediate oxygen barrier layer comprising a metallized film selected from metallized biaxially oriented polyester terephthalate and metallized biaxially oriented nylon; and
(iii) an outer surface layer comprising a polymeric layer selected from the group consisting of olefin polymers and polyester homopolymers or copolymers having a silicone exterior coating, said outer layer having a Vicat Softening Point greater than 90° C.; wherein said multilayer film laminate has a total thickness of less than 4.0 mil.

21. A multilayer film laminate adapted for aseptic packaging applications, said film comprising:
(a) an inner polymeric surface sealant layer comprising an olefin polymer having a Vicat Softening Point greater than 90° C.;
(b) an intermediate oxygen barrier layer comprising a metallized film selected from metallized biaxially oriented polyester terephthalate and metallized biaxially oriented nylon; and
(c) an outer polymeric surface layer selected from the group consisting of olefin polymers having a Vicat Softening Point greater than 90° C. and polyester homopolymers or copolymers having a hydrogen peroxide resistant exterior coating; wherein said multilayer film laminate has a total thickness of less than 4.0 mil.

\* \* \* \* \*